A. B. MUELLER.
PICTURE PROJECTION APPARATUS.
APPLICATION FILED NOV. 7, 1917.
1,317,635.
Patented Sept. 30, 1919.
2 SHEETS—SHEET 1.
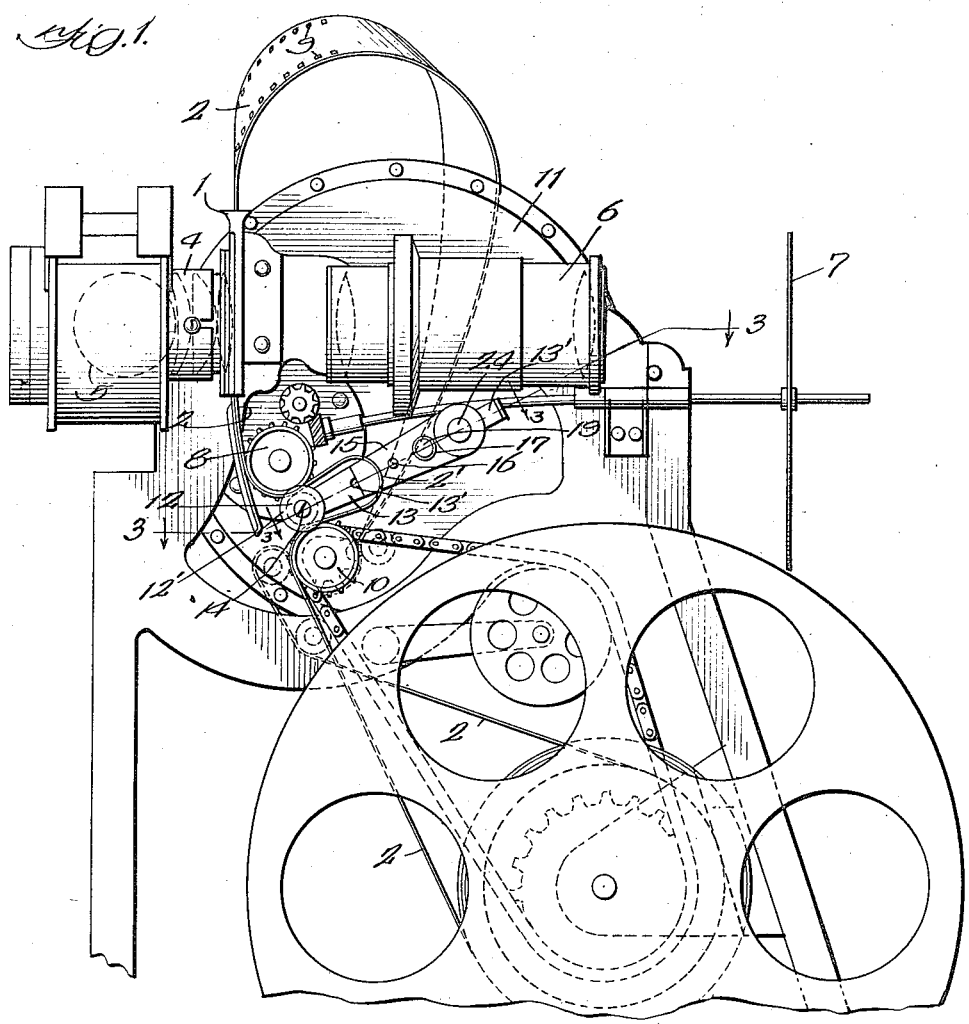
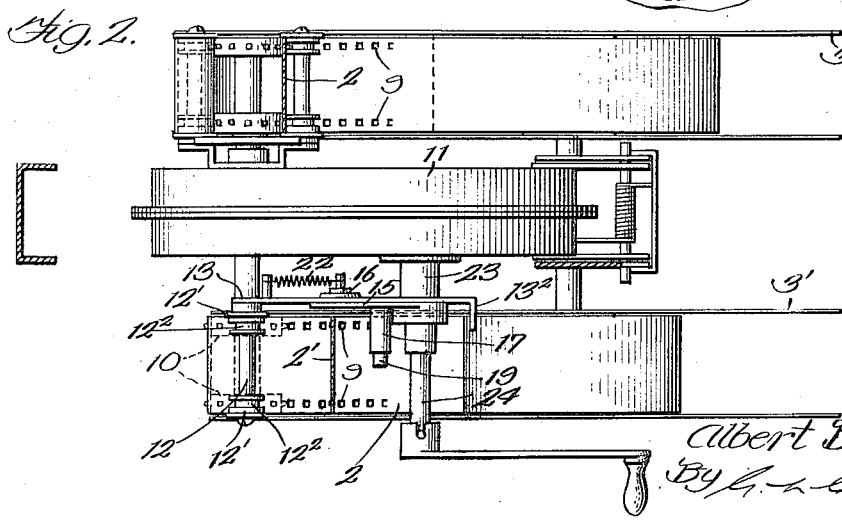
Inventor:
Albert B. Mueller.

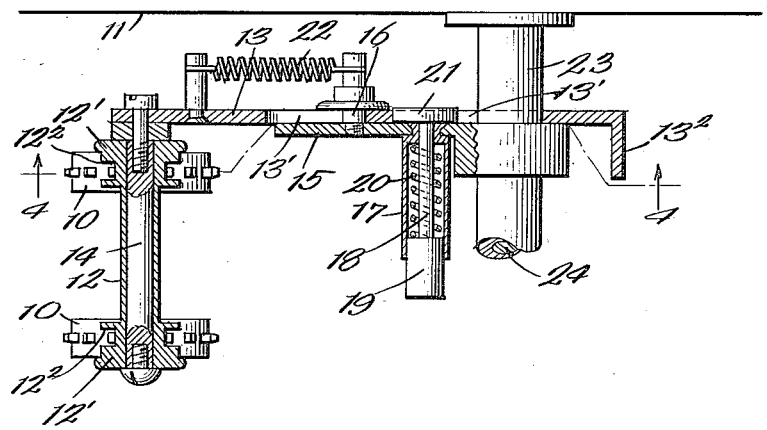
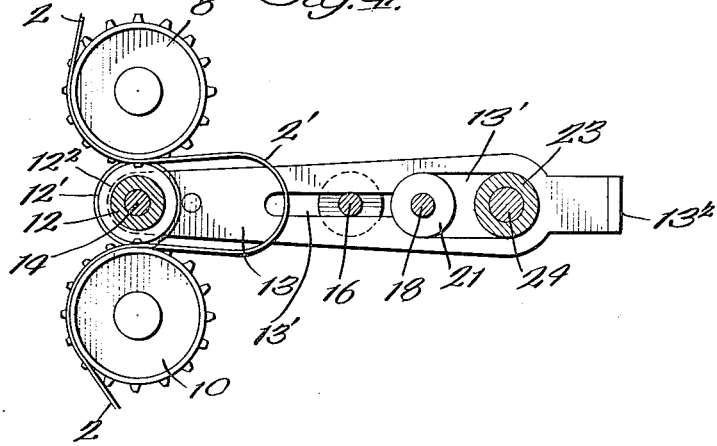

UNITED STATES PATENT OFFICE.

ALBERT B. MUELLER, OF CHICAGO, ILLINOIS.

PICTURE-PROJECTION APPARATUS.

1,317,635.  Specification of Letters Patent.  Patented Sept. 30, 1919.

Application filed November 7, 1917. Serial No. 200,684.

*To all whom it may concern:*

Be it known that I, ALBERT B. MUELLER, citizen of the United States, residing at Chicago, in the county of Cook and State of Illinois, have invented a certain new and useful Improvement in Picture-Projection Apparatus, of which the following is a full, clear, concise, and exact description.

My invention relates to motion picture projection apparatus employed either in projecting pictures upon screens or in projecting pictures from negatives in the operation of printing upon positives. Apparatus in conjunction with which my invention may be employed to advantage, but to which form of apparatus my invention is not to be limited, includes a guide having openings therein through which picture projecting light is passed and through which guide picture bearing film is passed successively to present pictures to the openings in the guide. The apparatus also includes an intermittently operated pinion structure for effecting step by step movement of the film through the guide, a second pinion structure having continuous rotation for passing the film on from the intermittently operated pinion, and a reel upon which the film is wound as it passes from the second pinion structure. The film is looped between the aforesaid pinion structures in order that the continuously operating pinion structure may feed the film toward the reel at times when the intermittently operated pinion structure is at rest and without regard to the rate at which the intermittently operated pinion structure moves the film toward the continuously operated pinion structure.

Said pinion structures are approached sufficiently to enable me to interpose an idler roller structure or other means therebetween for maintaining the sides of the loop that is formed in the film in mesh with the pinion structures and while I prefer to employ a single roller I do not wish to be limited thereto nor do I wish to be limited, in all embodiments of the invention, to pinion structures one of which is intermittently operated and the other of which is constantly operated although pinion structures of this nature are employed when one of the pinion structures is used to effect the step by step movement of the film through the guide.

I will explain my invention more fully by reference to the accompanying drawings showing the preferred embodiment thereof and in which Figure 1 is a front side view of so much of a motion picture apparatus as is necessary to understand the relation of my invention thereto; Fig. 2 is a sectional plan view of the structure shown in Fig. 1 with some of the parts omitted; Fig. 3 is a view on line 3—3 of Fig. 1; and Fig. 4 is a view on line 4—4 of Fig. 3.

Like parts are indicated by similar characters of reference throughout the different figures.

The motion picture apparatus illustrated is one which is adapted to the projection of pictures upon a screen and includes a guide 1 through which picture bearing film 2 is fed downwardly from a supply reel 3. Upon the rear side of the guide 1 is the condensing lens structure 4. At the rear of this lens structure there is a lamp 5 contained in a suitable housing. In front of the guide 1 there is the projecting lens structure 6 and in front of this projecting lens structure is the shutter 7 that permits the passage of light to the screen as each picture is held in the guide 1 in alinement or registry with the openings provided therein and prevents the passage of light to the screen as each picture is being replaced by a succeeding picture. The film is downwardly fed through the guide by means of an intermittently operated pinion structure 8 which, in this instance, includes two pinions, the teeth upon each being in mesh with the apertures 9 along the two longitudinal edges of the film. I do not wish to be limited, however, to the inclusion of two pinions in such pinion structure. This pinion structure is turned one step to remove each picture from the presence of the condensing lens structure 4 and to substitute a succeeding picture for the removed picture, it requiring, in the construction shown, one revolution of the pinion structure 8 for the successive presentation of four pictures, it taking a quarter of a revolution to replace each picture by a succeeding picture. The means by which the pinion structure 8 is thus intermittently operated is well known by those skilled in the art and does not need illustration or description.

The film is passed downwardly on from the pinion structure 8 by the pinion structure 10 that likewise has two pinions but to the employment of which two pinions the invention is not to be limited. The pinion structure 10 is uninterruptedly operated at a constant rate of speed by suitable gearing which is familiar to those skilled in the art. The gearing for operating the pinion structures 8 and 10 is included in the gear casing 11 commonly known as a head. The film is passed from the pinions 10 to that which is normally the winding reel $3^1$. The film is formed into a loop $2^1$ between the pinion structures 8 and 10 in order that the film may leave the pinion structure 8 step by step and may be uninterruptedly passed downwardly on at the pinion structure 10 at a uniform rate of speed.

By means of my invention the equipment employed for maintaining the film in mesh with the pinion structures is simplified and is preferably inclusive of a single idler roller 12 that enters the loop $2^1$ and presses the sides of the loop toward the pinion structures to maintain the film in mesh therewith. This roller is preferably movable out of relation with the pinion structures to permit of unmeshing of the film and pinions and the adjustment of the film upon the pinion structures and this movement of the roller for this purpose is desirably toward the bight in the loop $2^1$ and is preferably in a line that is perpendicular to the plane containing the axes of the pinion structures 8 and 10.

The roller 12 preferably has a head $12^1$ at each end, there being a groove $12^2$ in each head that is in the plane of the teeth upon the pinion structures 8 and 10, the pinions of one pinion structure being in the same planes with the pinions of the other pinion structure. These grooves $12^2$ receive the teeth upon the pinions. The parts of the roller heads $12^1$ along side of these grooves $12^2$ engage the film and hold it against the sides of the pinions that are adjacent the teeth thereof whereby the roller heads maintain the film and pinions in mesh.

The idler roller 12 has a mounting which is inclusive of a mounting plate 13 and a shaft 14 carried by this plate and upon which shaft the roller is free to turn idly. The mounting plate 13 has a slot $13^1$ extending lengthwise thereof and in the direction in which the mounting plate is reciprocable. A stationary bracket 15 carries a stationary screw 16 that projects through the slot $13^1$. The stationary bracket 15 carries a spring barrel 17 in which a plunger 18 is reciprocable. This plunger 18 has a front head 19 by which the plunger may be pressed inwardly against the force of a spring 20. The plunger 18 has a rear head 21 that is normally received in the larger right hand end of the slot $13^1$ and normally engages the mounting plate 13 at the left hand end of such enlarged portion of the slot $13^1$, as indicated clearly in Fig. 4.

When the plunger 18 is pressed inwardly against the force of the spring 20 the plunger head 21 is moved rearwardly out of the slot $13^1$ whereupon the retractile spring 22 (which is anchored at one end to the reciprocable plate 13 and at the other end to the stationary screw 16 upon the stationary bracket 15) pulls the mounting plate 13 toward the stationary bracket 15 in which movement of the mounting plate the idler roller 12 is moved away from the pinion structures 8 and 10 farther into the loop $2^1$ in the film and toward the bight of such loop.

When the roller 12 is to be restored to its normal position between the pinion structures 8 and 10 the lug $13^2$ upon the mounting plate 13 is pressed toward said pinion structure against the force of the spring 22 and when the larger and right hand part of the slot $13^1$ is moved into registry with the plunger head 21, the spring 20 will force the movement of the head 21 into such larger portion of the slot $13^1$ whereupon such head 21 maintains the roller 12 in its normal position against the force of the spring 22. The screw 16 and the bearing 23 for the shaft 24 that operates the gearing 8, 10, by means that need not be illustrated, serve as a guide to define the direction of reciprocable movement of the plate 13 which direction is substantially at right angles to the line joining centers of the pinions 8 and 10 whereby these pinions may be closely approached and the action of the idler may be similar upon the film where engaging each sprocket. The plunger 18, its head 21, and the spring 20 constitute a form of latch whereby the mounting plate 13 is held in its normal position and which latch is tripped when the plunger is pressed inwardly to permit the mounting plate to be withdrawn toward the bracket 15 to bring the roller 12 farther into the loop $2^1$. I do not wish to be limited, however, to this form of latching mechanism.

By means of my invention the equipment for maintaining the film in mesh with the pinion structures 8 and 10 is much simplified and the operation thereof whereby the adjustment of the film in its engagement with said pinion structures may be permitted is simplified.

Claims common to the structure herein disclosed and the structure disclosed in my co-pending application Serial No. 200,690, filed of even date herewith are contained in the latter application.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Picture projection apparatus including a reel carrying a picture bearing film; two pinion structures in mesh with the film and between which the film is looped; an idler roller within the loop in the film and interposed between said pinion structures and holding the loop sides in mesh with the pinion structures; a mounting for said roller which is movable from its normal position to separate the roller from the pinion structures; a spring for moving said mounting from its normal position to bring the roller nearer the bight in the film; and a latch for holding the mounting in its normal position.

2. Picture projection apparatus including a reel carrying a picture bearing film; two pinion structures in mesh with the film and between which the film is looped; an idler roller within the loop in the film and interposed between said pinion structures and holding the loop sides in mesh with the pinion structures; a mounting for said roller which has alternative positions in one of which the roller is separated from the pinion structures and in the other of which the roller is closely approached to said pinion structures; a spring for moving said mounting from one to the other of its alternative positions; and a latch for holding the mounting in the position from which it is movable by the spring.

3. Picture projection apparatus including a reel carrying a picture bearing film; two pinion structures in mesh with the film and between which the film is looped; an idler roller within the loop in the film and interposed between said pinion structures and holding the loop sides in mesh with the pinion structures; a mounting for said roller; and a guide for defining direction of bodily movement of the roller which is substantially at right angles to a line joining the centers of the pinion structures.

4. Picture projection apparatus including two pinion structures in mesh with the film and between which the film is looped; an idler roller within the loop in the film and interposed between said pinion structures and holding the loop sides in mesh with the pinion structures; a mounting for said roller movable to bring the roller from and toward the pinion structures; and a latch for the mounting.

In witness whereof, I hereunto subscribe my name this eighth day of October, A. D. 1917.

ALBERT B. MUELLER.